(12) United States Patent
Akiyama (10) Patent No.: US 7,204,594 B2
(45) Date of Patent: Apr. 17, 2007

(54) PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/322,218

(22) Filed: Jan. 3, 2006

(65) Prior Publication Data

US 2006/0164601 A1 Jul. 27, 2006

(30) Foreign Application Priority Data

Jan. 27, 2005 (JP) .............................. 2005-019258

(51) Int. Cl.
*G03B 21/00* (2006.01)
*G03B 21/14* (2006.01)
*G03B 21/28* (2006.01)
*G03B 21/20* (2006.01)

(52) U.S. Cl. .............................. 353/33; 353/97; 353/99; 353/102

(58) Field of Classification Search ................. 353/20, 353/30, 31, 33, 97, 99, 102, 122; 348/742, 348/743, 744; 349/9; 463/20
See application file for complete search history.

(56) References Cited

U.S. PATENT DOCUMENTS

2002/0180932 A1* 12/2002 Shimizu et al. ............... 353/20
2004/0046946 A1* 3/2004 Kim ............................ 353/101
2005/0179872 A1* 8/2005 Akiyama ...................... 353/31
2006/0092390 A1* 5/2006 Akiyama ..................... 353/102

FOREIGN PATENT DOCUMENTS

JP A 2002-148712 5/2002

OTHER PUBLICATIONS

Kurita, "Picture Quality of Hold Type Display for Moving Images," Technical Report of IEICE, pp. 55-60, 1999, with translation.

* cited by examiner

*Primary Examiner*—Melissa Jan Koval
(74) *Attorney, Agent, or Firm*—Oliff & Berridge, PLC (57) ABSTRACT

A projector including an illumination device, an electra-optic modulator and a projection optical system. The illumination device is provided with a light source that emits a substantially parallel luminous flux to the side of a region to be illuminated; a first lens array including a plurality of first small lenses; a second lens array including a plurality of second small lenses corresponding to the first lens array; and a superimposing lens that superimposes the partial luminous fluxes coming from the second lens array. The projector further including a light shielding member provided with a stray light elimination member disposed to be substantially optically conjugate with the plurality of first small lenses and the electro-optic modulator for adjusting the cross-section shape of the luminous flux; and a rotating prism for scanning the luminous flux from the light shelding member in synchronization with a frame rate of the electro-optic modulator.

7 Claims, 8 Drawing Sheets

PROJECTOR

BACKGROUND

1. Technical Field

The present invention relates to a projector.

2. Related Art

Figure 9A:
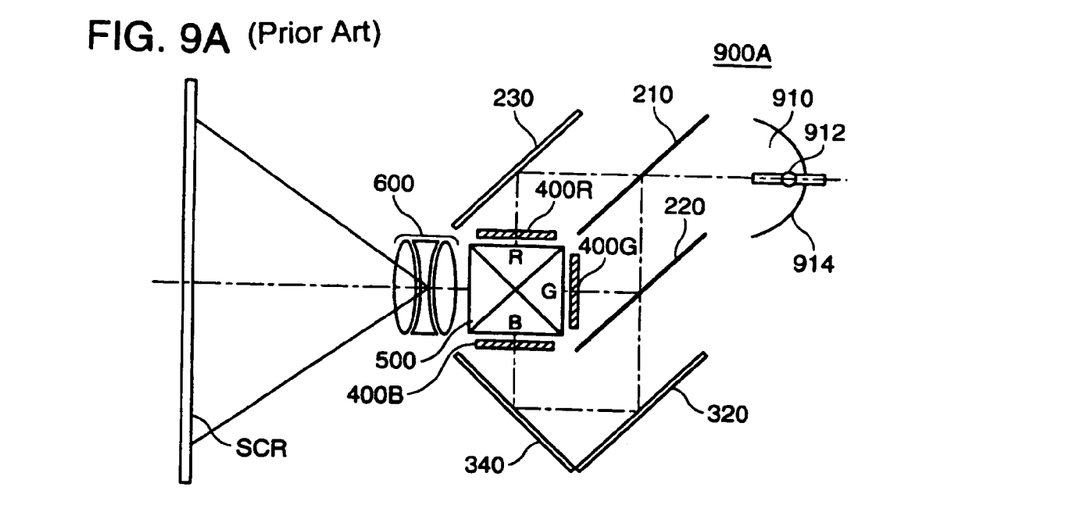
FIGS. 9A to 9C are all a diagram for illustrating a projector 900A of a typical type.
Figure 9B:
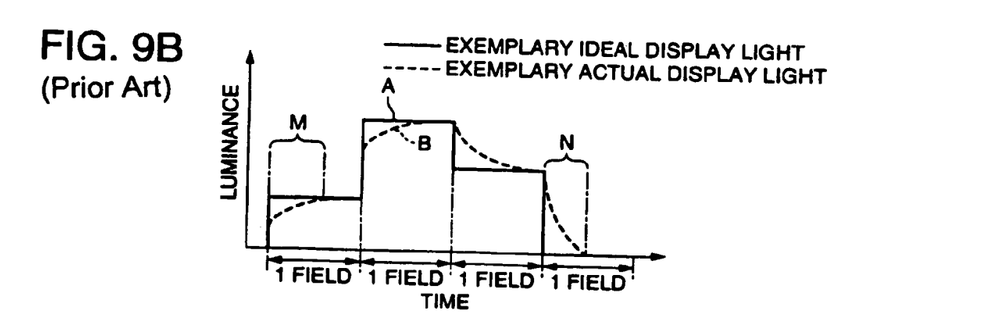
Figure 9C:
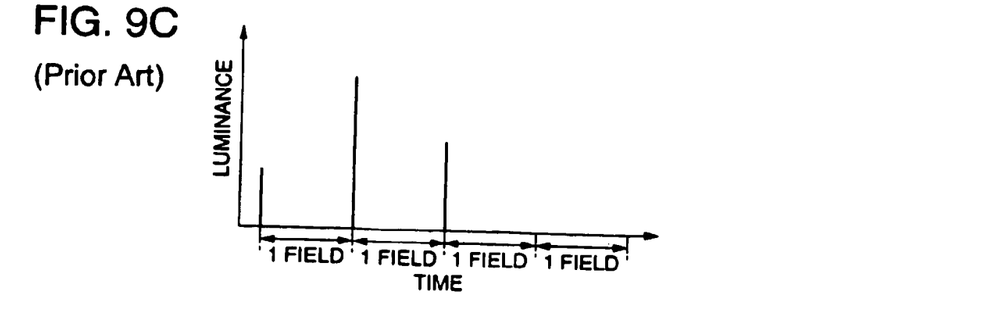

FIGS. 9A to 9C are all a diagram for illustrating a projector 900A of a typical type. Specifically, FIG. 9A is a diagram showing a system of the projector 900A, and FIGS. 9B and 9C are both a diagram for illustrating problems of such a projector 900A.

The projector 900A is provided with liquid crystal devices 400R, 400G, and 400B for use as electro-optic modulators, each serving as a hold-type display unit with such luminance characteristics as shown in FIG. 9B. Unlike an impulse-type display unit with such luminance characteristics as shown in FIG. 9C, e.g., CRT, the hold-type display unit has a problem of not-smooth moving image display due to a so-called persistence of vision. As to the persistence of vision, refer to Non-patent Document 1 ("Quality of Moving Images Displayed on Hold-type Display", Technical Report of The Institute of Electronics, Information and communications Engineers, EID99-10, pp. 55–60 (1999–06)), for example.

Figure 10A:
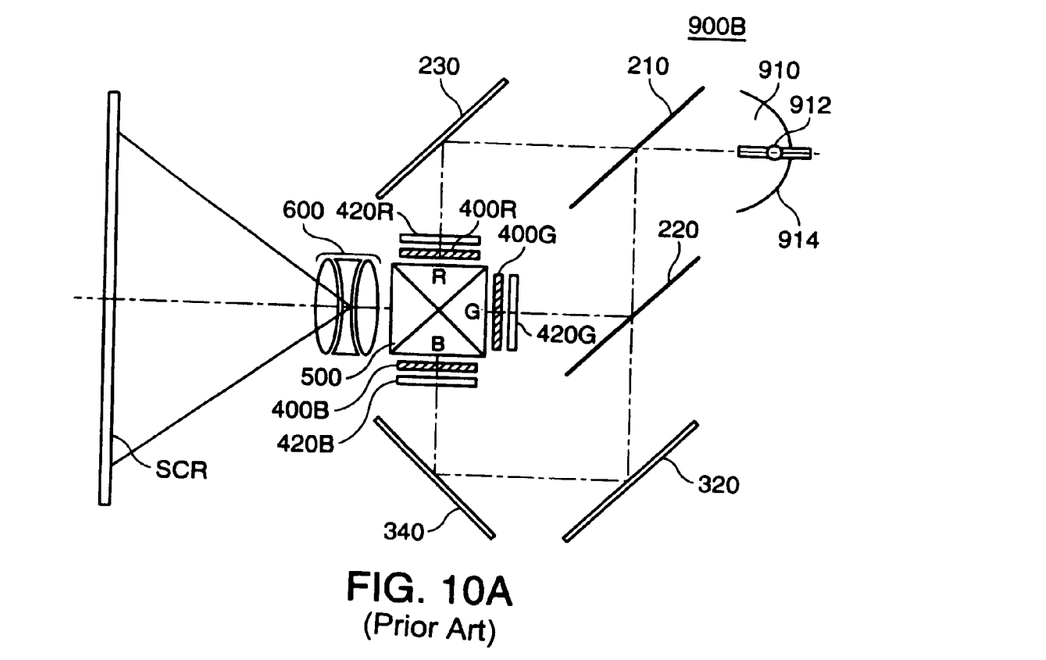
FIGS. 10A to 10C are all a diagram for illustrating another typical projector 900B.
Figure 10B:
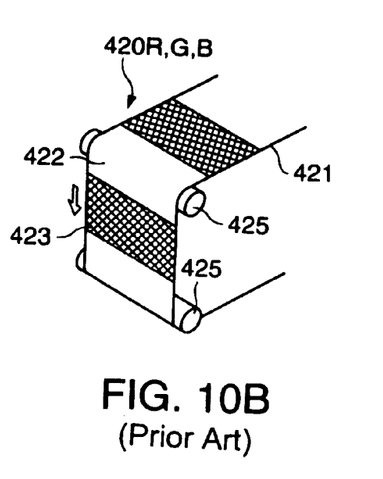
Figure 10C:
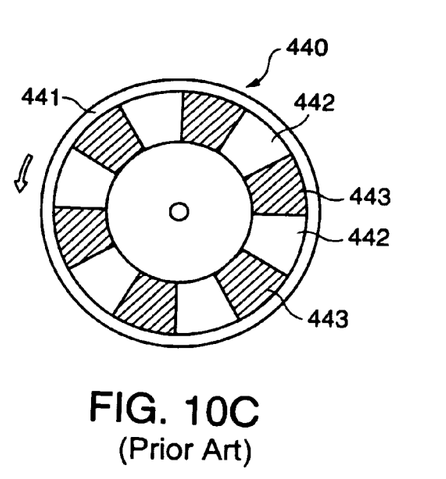

As a measure taken against the above-described problem, Patent Document 1 (JP-A-2002-148712 (FIGS. 1 to 7)) describes an exemplary projector. FIGS. 10A to 10C are all a diagram for illustrating such another typical projector 900B. Specifically, FIG. 10A is a diagram showing a system of the projector 900B, and FIGS. 10B and 10C are both a diagram showing an optical shutter for use with such a projector 900B.

As shown in FIG. 10A, the projector 900B includes optical shutters 420R, 420G, and 420B on the light incident-side of the liquid crystal devices 400R, 400G, and 400B to cut off the light in an intermittent manner, attempting to correct the so-called persistence of vision to derive smooth moving image display high in quality.

The issue with such a typical projector of Patent Document 1 is that the light use efficiency is considerably reduced due to the optical shutters cutting off the light in an intermittent manner.

SUMMARY

An advantage of some aspects of the invention is to provide a projector of achieving high-quality smooth moving image display without causing considerable reduction of the light use efficiency.

An aspect of the invention is directed to a projector that includes: an illumination device; an electro-optic modulator that modulates a luminous flux coming from the illumination device in accordance with image information; and a projection optical system that projects a light modulated by the electro-optic modulator. The illumination device is provided with: a light source device that emits a substantially parallel luminous flux to the side of a region to be illuminated; a first lens array including a plurality of first small lenses that divide the luminous flux coming from the light source device into a plurality of partial luminous fluxes; a second lens array including a plurality of second small lenses corresponding to the plurality of first small lenses of the first lens array; and a superimposing lens that superimposes, in the region to be illuminated, the partial luminous fluxes coming from the plurality of second small lenses of the second lens array. In the projector, each first small lens in the first lens array has a plane shape compressed in a direction which is either vertical or horizontal direction of the image formation region of the electro-optic modulator to make the luminous flux coming from the illumination device entirely illuminate an image formation region of the electro-optic modulator in the other direction thereof, and partially illuminate the image formation region in the one direction. The projector further includes: a light shielding member that is disposed between the illumination device and the electro-optic modulator to be substantially optically conjugate with the plurality of first small lenses and the electro-optic modulator for adjusting the cross section shape of the luminous flux; and a rotating prism that is disposed on the side of the electro-optic modulator of the light shielding member for scanning, on the image formation region of the electro-optic modulator, the luminous flux coming from the light shielding member along the one direction in synchronization with a frame rate of the electro-optic modulator. The light shielding member is provided with a stray light elimination member that reflects a reflection light from a light incident surface of the rotating prism in a direction different from the rotating prism.

As to luminous fluxes each having such a cross section, i.e., compressed in the one direction, as to entirely illuminate the image formation region of the electro-optic modulator in the other direction, and partially illuminate the image formation region in the one direction, the projector according to the aspect of the invention enables to scan such luminous fluxes on the image formation region along the one direction in synchronization with a frame rate of the electro-optic modulator. This allows alternate scrolling in the image formation region of the electro-optic modulator between a region to be illuminated and a region not to be illuminated so that the persistence of vision is corrected, favorably leading to high-quality smooth moving image display.

With the projector according to the aspect of the invention, the first lens array in which a plane shape of the first small lenses each compressed in the one direction is used to implement the luminous fluxes compressed in the one direction. Unlike the configuration of using optical shutters, such a configuration favorably prevents considerable reduction of the light use efficiency thanks to the fact that the luminous fluxes coming from the light source device are guided with certainty to the image formation region of the electro-optic modulator.

As such, the projector according to the aspect of the invention successfully achieves high-quality smooth moving image display without causing considerable reduction of the light use efficiency.

The projector according to the aspect of the invention includes the system serving as the illumination device with the first lens array, the second lens array, and the superimposing lens therein to make the light uniform. Such an illumination device raises a concern about an arc tube having a light emitting region not of a point but of a finite size. More in detail, the partial luminous fluxes coming from the first small lenses are thus not fit to their corresponding second small lenses so that the luminous fluxes at the position substantially optically conjugate with the first small lenses will be blurred and looked swelled a little in cross section compared with the shape similar to the first small lenses.

For betterment, with the light shielding member, the projector according to the aspect of the invention can adjust the cross section shape of the luminous fluxes to be similar in shape to the first small lenses at the position substantially optically conjugate therewith, and by extension, similar in shape to the region to be illuminated of the electro-optic modulator.

The issue here is that even if a reflection reduction layer is formed on the light-pass surface of the rotating prism, reflections of about 0.5 percent occur thereon (reflections of about several percent occur with no reflection reduction layer). As a result, the luminous fluxes are partially reflected on both the light incident and light exiting surfaces of the rotating prism. The light reflected on the light incident surface is partially reflected again this time by the light shielding member, and then enters into the rotating prism. This resultantly blurs the cross section shape of the luminous fluxes specifically at both end portions in the one direction on the image formation region of the electro-optic modulator, and by extension, on the projection surface thereof, thereby reducing the effects of achieving high-quality smooth moving image display.

As a measure against such a problem, however, the projector according to the aspect of the invention is provided with the stray light elimination member. More in detail, by the stray light elimination member, the reflection light from the light incident surface of the rotating prism is reflected in the direction different from the rotating prism. Even if the light is then reflected again by the light shielding member, the light is not thus directed to the rotating prism any more. Such a configuration accordingly corrects the problem of reducing the effects of high-quality smooth moving image display due to the blurring of the cross section shape of the luminous fluxes specifically at both end portions in the one direction on the image formation region of the electro-optic modulator, and by extension, on the projection surface thereof.

In the projector according to the aspect of the invention, an aperture is provided on the light shielding member, and the stray light elimination member is preferably a triangular prism that is provided on both side portions of the aperture in the one direction, and the stray light elimination member reflects the reflection light from the light incident surface of the rotating prism substantially along the one direction.

With such a configuration, the reflection light coming from the light incident surface of the rotating prism is reflected substantially along the one direction. Even if the light is then reflected again by the light shielding member, the light is not thus directed to the rotating prism any more.

In the projector according to the aspect of the invention, an aperture is provided on the light shielding member, and the stray light elimination member is preferably a reflection mirror that is provided on both side portions of the aperture in the one direction, and the stray light elimination member reflects the reflection light from the light incident surface of the rotating prism substantially along the one direction.

Also with such a configuration, the reflection light coming from the light incident surface of the rotating prism is reflected substantially along the one direction. Even if the light is then reflected again by the light shielding member, the light is not thus directed to the rotating prism any more.

In the projector according to the aspect of the invention, an aperture is provided on the light shielding member, and the stray light elimination member is preferably a reflection mirror that is provided on both side portions of the aperture in the one direction, and the stray light elimination member reflects the reflection light from the light incident surface of the rotating prism toward the side of the illumination device.

With such a configuration, the reflection light coming from the light incident surface of the rotating prism is reflected toward the side of the illumination device. Even if the light is then reflected again by the light shielding member, the light is not thus directed to the rotating prism any more.

In the projector according to the aspect of the invention, the light source device is preferably provided with an arc tube, an ellipsoidal reflector that reflects a light from the arc tube, and a collimating lens that collimates a light reflected by the ellipsoidal reflector, or provided with the arc tube, and a paraboloidal reflector that reflects the light from the arc tube as a substantially collimated light.

With such a configuration, the former configuration can implement the light source device compact in size compared with the light source device using the paraboloidal reflector. The latter configuration requires no collimating lens to derive substantially collimate luminous fluxes, thereby implementing the light source device with less number of components compared with the light source device using an ellipsoidal reflector, which requires a collimating lens.

In the projector according to the aspect of the invention, the arc tube is preferably provided with an auxiliary mirror that reflects, toward the arc tube, the light emitted from the arc tube toward the side of the region to be illuminated.

With such a configuration, the light directed from the arc tube toward the side of the region to be illuminated is reflected toward the arc tube, thereby eliminating the need for size adjustment of the ellipsoidal or paraboloidal reflector to cover the side end portions of the region to be illuminated of the arc tube. This favorably reduces the size of the ellipsoidal or paraboloidal reflector, leading to the small-sized projector. This means possible further size reduction of the first and second lens arrays, the superimposing lens, the color separation optical system, and others. With this being the case, the projector can be reduced in size to a further degree.

The projector according to the aspect of the invention preferably includes: a color-separation and light-guiding system that is disposed between the rotating prism and the electro-optic modulator, and separates the luminous flux coming from the rotating prism into a plurality of color lights; two or more of the electro-optic modulator that modulate the color lights coming from the color-separation and light-guiding system in accordance with image information corresponding to each of the color lights; and a cross dichroic prism that combines the color lights modulated in the electro-optic modulators.

Such a configuration can derive, while achieving high-quality smooth moving image display, an excellent-quality full-color projector (of 3-LCD projection, for example) without causing considerable reduction of the light use efficiency.

BRIEF DESCRIPTION OF THE DRAWINGS

The invention will be described with reference to the accompanying drawings, wherein like numbers reference like elements.

DESCRIPTION OF EXEMPLARY EMBODIMENTS

In the below, projectors of first to fourth embodiments of the invention are described by referring to the accompanying drawings.

First Embodiment

Figure 1A:
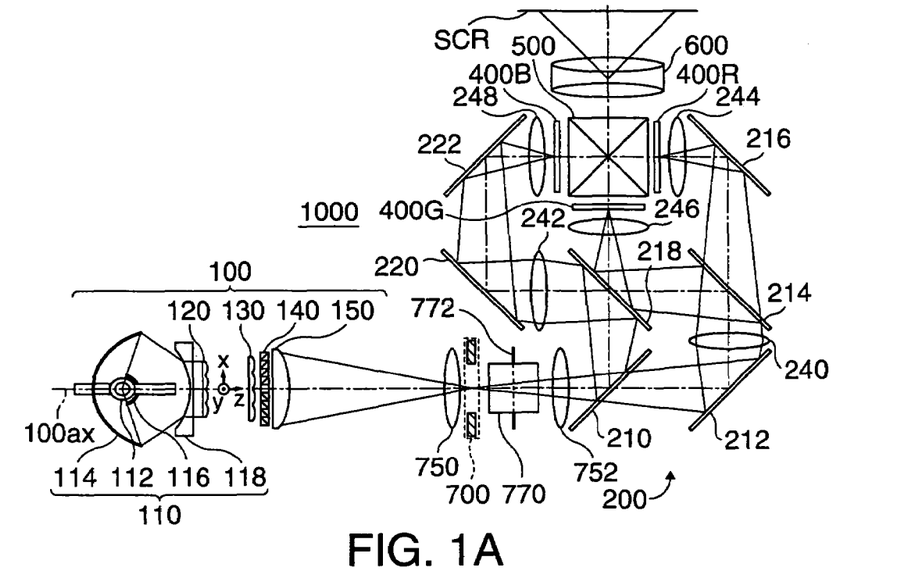
FIGS. 1A to 1E are all a diagram for illustrating a projector 1000 of a first embodiment.
Figure 1B:
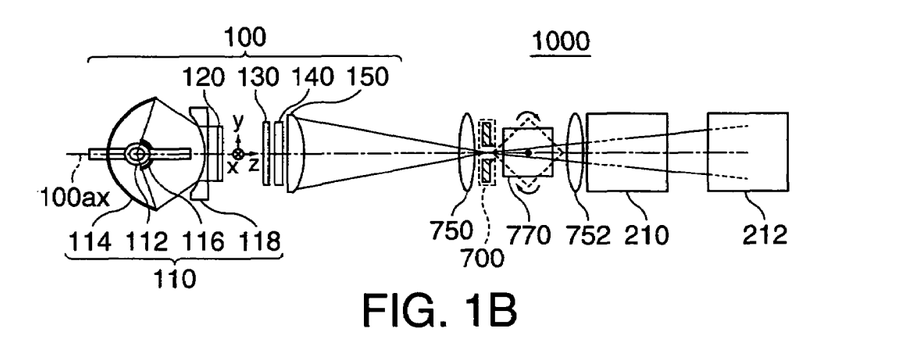
Figure 1C:
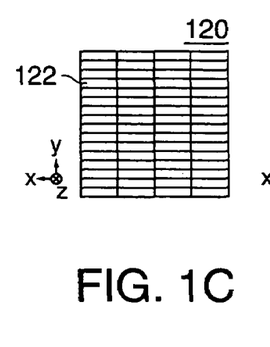
Figure 1D:
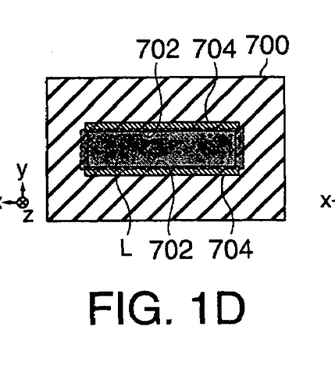
Figure 1E:
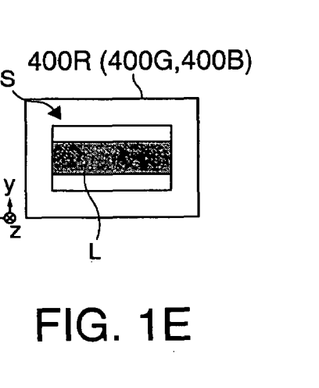

FIGS. 1A to 1E are all a diagram for illustrating a projector 1000 of the first embodiment. Specifically, FIG. 1A is a diagram showing a system of the projector 1000 viewed from above, FIG. 1B is a diagram showing the system of the projector 1000 viewed from the side, FIG. 1C is a diagram showing the front view of a first lens array 120, FIG. 1D is a diagram showing the illumination state on a light shielding member 700, and FIG. 1E is a diagram showing the illumination state on a liquid crystal display 400R.

In the below, three directions orthogonal to one another are denoted as x-, y-, and z-axis directions. i.e., the z-axis direction is directed toward an illumination optical axis 100*ax* in FIG. 1A, the x-axis direction is parallel to the paper surface of FIG. 1A, and orthogonal to the z-axis, and the y-axis direction is vertical to the paper surface of FIG. 1A, and orthogonal to the z axis.

As shown in FIG. 1A, the projector 1000 of the first embodiment is configured to include an illumination device 100, a color-separation and light-guiding system 200, three liquid crystal devices of 400R, 400G, and 400B, a cross dichroic prism 500, and a projection optical system 600. More specifically, the color-separation and light-guiding system 200 separates a luminous flux coming from the illumination device 100 into three color lights of red, green, and blue, and guides the resulting color lights to the region to be illuminated. The liquid crystal devices 400R, 400G, and 400B all serve as an electro-optic modulator, modulating their corresponding color light as a result of color separation in the color-separation and light-guiding system 200 in accordance with image information. The cross dichroic prism 500 combines the resulting color lights modulated by the liquid crystal devices 400R, 400G, and 400B. The projection optical system 600 projects, onto the projection surface exemplified by a screen SCR, the light derived by color-light-combination by the cross dichroic prism 500.

The illumination device 100 is configured to include a light source device 110, a first lens array 120, a second lens array 130, a polarization conversion element 140, and a superimposing lens 150. More in detail, the first lens array 120 includes a plurality of first small lenses 122, dividing a luminous flux coming from the light source device 110 into a plurality of partial luminous fluxes. The second lens array 130 includes a plurality of second small lenses 132 (not shown) corresponding to the first small lenses 122 of the first lens array 120. When the luminous fluxes coming from the light source device 110 are not aligned in polarizing direction, the polarization conversion element 140 serves to align the luminous fluxes to be linear of a type. The superimposing lens 150 serves to superimpose one another the partial luminous fluxes coming from the polarization conversion element 140 in the region to be illuminated.

The light source device 110 is configured to include an ellipsoidal reflector 114, an arc tube 112, and a collimating lens 118. More specifically, the arc tube 112 has a light-emitting center in the vicinity of a first focus of the ellipsoidal reflector 114. The collimating lens 118 converts the light converged as a result of reflection by the ellipsoidal reflector 114 into substantially collimated light. The arc tube 112 is provided with an auxiliary mirror 116, serving as a reflection unit that reflects, in the direction of the arc tube 112, the light directed from the arc tube 112 toward the region to be illuminated.

The arc tube 112 is configured to include a tubular bulb section, and a pair of sealing sections that respectively extend toward both sides of the tubular bulb section.

The ellipsoidal reflector 114 is configured to include a tubular neck-like section, and a reflective concave surface. The neck-like section is passed through and securely fixed to one of the sealing sections of the arc tube 112. The reflective concave surface reflects the light coming from the arc tube 112 toward a second focus.

The auxiliary mirror 116 serves as a reflective member that covers substantially half of the tubular bulb section of the arc tube 112. The auxiliary mirror 116 is so disposed as to face the reflective concave surface of the ellipsoidal reflector 114, and is passed through and securely fixed to the other sealing section of the arc tube 112.

With such an auxiliary mirror 116, the light coming from the arc tube 112 directed toward the opposite side of the ellipsoidal reflector 114, i.e., toward the side of the region to be illuminated, is reflected toward the ellipsoidal reflector 114. The reflection light is reflected again this time by the reflective concave surface of the ellipsoidal reflector 114, and converged at the second focus. As such, similarly to the light emitted from the arc tube 112 directly toward the ellipsoidal reflector 114, the light can be converged at the second focus of the ellipsoidal reflector 114.

The collimating lens 118 is a concave lens, and is disposed on the region to be illuminated side of the ellipsoidal reflector 114. The collimating lens 118 is configured to substantially collimate the light coming from the ellipsoidal reflector 114.

The first lens array 120 serves as an optical element that divides a luminous flux coming from the collimating lens 118 into a plurality of partial luminous fluxes. The first lens array 120 is configured to plurally include the first small lens 122, those of which are arranged in matrix in the surface orthogonal to the illumination optical axis 100*ax*.

The second lens array 130 also serves as an optical element that converges the partial luminous fluxes divided by the first lens array 120. The second lens array 130 is configured to plurally include the second small lens 132, those of which are arranged in matrix in the surface orthogonal to the illumination optical axis 100*ax* similarly to the first lens array 120.

When the partial luminous fluxes divided by the first lens array 120 are not aligned in polarizing direction, the polarization conversion element 140 serves to align the polarizing direction, and emit the resulting luminous fluxes as linear polarized light substantially of a type.

The superimposing lens 150 is an optical element that converges the partial luminous fluxes those having been through with the first and second lens arrays 120 and 130, and the polarization conversion element 140, and superimposes the resulting partial luminous fluxes on the image formation regions of the liquid crystal devices 400R, 400G, and 400B.

The luminous fluxes emitted from the superimposing lens 150 are directed into the rotating prism 770. The rotating prism 770 is disposed between the illumination device 100 and the liquid crystal device 400R. In synchronization with the frame rate of the liquid crystal device 400R, the rotating prism 770 serves to scan the luminous fluxes on the image formation region S along the vertical direction, i.e., y-axis direction. This is applicable also to the liquid crystal devices 400G and 400B. Before and after the rotating prism 770, field lenses 750 and 752 are respectively disposed so as to effectively direct the light into relay lenses 240 and 242, which will be described later.

The first lens array 120 and the rotating prism 770 will be described in detail later.

As shown FIG. 1A, the color-separation and light-guiding system 200 is configured to include dichroic mirrors 210 and 214, reflection mirrors 212, 216, 218, 220, and 222, and the relay lenses 240 and 242. The color-separation and light-guiding system 200 serves to separate the luminous flux coming from the rotating prism 770 into three colors of red, green, and blue, and guide the resulting color lights to each corresponding liquid crystal devices of 400R, 400G, and 400B. The color-separation and light-guiding system 200 herein is a system having the equal optical path length from the illumination device 100 to each of the liquid crystal devices of 400R, 400G, and 400B.

As to the light coming from the rotating prism 770, the dichroic mirror 210 allows the red and green light components to pass therethrough, and reflects the blue light component. The blue light component reflected by the dichroic mirror 210 is reflected by the reflection mirror 218, and then reflected again this time by the reflection mirrors 220 and 222 after passing through the relay lens 242. The reflected light eventually reaches the liquid crystal device 400B specifically for the blue light after passing through the field lens 248. On the other hand, the red and green light components having been passed through the dichroic mirror 210 pass through the relay lens 240 after being both reflected by the reflection mirror 212. As to such red and green light components emitted from the relay lens 240, the red light component reaches the liquid crystal device 400R that is specifically for the red light after passing through the dichroic mirror 214, being reflected by the reflection mirror 216, and passing through the field lens 244. The green light component is reflected by the dichroic mirror 214 and then by the reflection mirror 218, and passes through the field lens 246 before reaching the liquid crystal device 400G that is specifically for the green light. Note here that the field lenses 244, 246, and 248 are provided, respectively, before the liquid crystal displays 400R, 400G, and 400B along the optical paths of each lights, for converting the partial luminous fluxes coming from the second lens array 130 into luminous fluxes being substantially collimate with the main beams of light.

The liquid crystal devices 400R, 400G, and 400B all form color images through modulation of luminous fluxes in accordance with image information, and are to be illuminated by the illumination device 100. Although not shown, a light incident-side polarizer is disposed between the color-separation and light-guiding system 200 and the liquid crystal device 400R, and a light exiting-side polarizer is disposed between the liquid crystal device 400R and the cross dichroic prism 500. This is applicable also to the liquid crystal devices 400G and 400B. The components of the light incident-side polarizer, the liquid crystal devices 400R, 400G, and 400B, and the light exiting-side polarizer are all used for optical modulation with respect to incoming color lights.

The liquid crystal devices 400R, 400G, and 400B are each configured by hermetically filling a liquid crystal substance between a pair of transparent glass substrates. The liquid crystal substance is an electro-optic substance. For example, with a polysilicon TFT (Thin-Film Transistor) serving as a switching element, the liquid crystal devices 400R, 400G, and 400B modulate the polarizing direction of the one-type linear polarizing light coming from the light incident-side polarizer. Such modulation is performed based on any given image signal.

The liquid crystal devices 400R, 400G, and 400B herein exemplarily have a plane shape of the rectangular shape, for wide vision, with "vertical dimension along y-axis direction: lateral dimension along x-axis direction=9:16".

The cross dichroic prism 500 is an optical element of forming color images through combination of optical images. The optical images are those having been modulated for every color light coming from the light exiting-side polarizer. This cross dichroic prism 500 is of square when viewed from above, made of four right-angle prisms attached together. The substantially-X-shaped interfaces of the right-angle prisms are formed with dielectric multilayer films. The dielectric multilayer film formed on one of the substantially-X-shaped interfaces reflects the red color lights, and the dielectric multilayer film formed on the other interface reflects the blue color lights. By such dielectric multilayer films, the red and blue lights are both bent in direction, and aligned with the heading direction of the green light so that three color lights are combined together.

The color images emitted from the cross dichroic prism 500 are enlarged and projected by the projection optical system 600, and form large-screen images on the screen SCR.

The characteristics of the projector 1000 of the first embodiment lay in the configuration of the first lens array 120 (and correspondingly, the configuration of the second lens array 130), the configuration of the light shielding member 700, and including the scan unit configured by the rotating prism 770.

Described in detail now are the first lens array 120, the rotating prism 770, and the light shielding member 700 in the projector 1000 of the first embodiment.

1. First Lens Array

As shown in FIG. 1C, the first lens array 120 carries a plurality of first small lenses 122, forming 4 lines in the lateral direction and 16 lines in the vertical direction. The first small lenses 122 in the first lens array 120 all have a plane shape of a rectangular shape of "vertical dimension along y-axis direction:lateral dimension along the x-axis direction=1:4".

That is, the first small lenses 122 in the first lens array 120 have the shape of the rectangular shape of "vertical dimension along y-axis direction:lateral dimension along x-axis direction=1:4", which is compressed in the vertical direction (refer to FIG. 1D). This is aimed for the luminous fluxes coming from the illumination device 100 to entirely illuminate the image formation regions S of the liquid crystal devices 400R, 400G, and 400B in the horizontal direction along the z-axis direction, and to illuminate 50 percent of the image formation region S in the vertical direction along the y-axis direction (refer to FIG. 1E).

According to such a projector 1000 of the first embodiment, as described above, by using the lens array formed by the first small lenses 122 being compressed in the vertical direction as the first lens array 120, the luminous fluxes are implemented with the cross section shape compressed in the vertical direction. As such, unlike the case of using optical shutters, the luminous fluxes coming from the light source device 110 are guided with certainty to the image formation regions of the liquid crystal devices 400R, 400G, and 400B, thereby preventing considerable reduction of the light use efficiency.

2. Rotating Prism

Figure 2A:
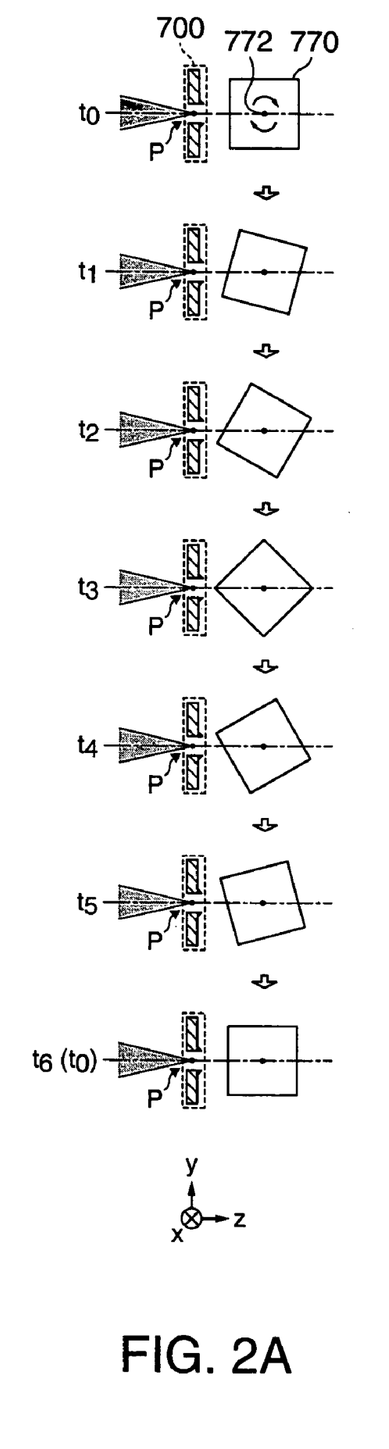
FIGS. 2A to 2C are all a diagram showing the relationship between the rotation of a rotating prism 770 and the illumination state on liquid crystal devices 400R, 400G, and 400B.
Figure 2B:
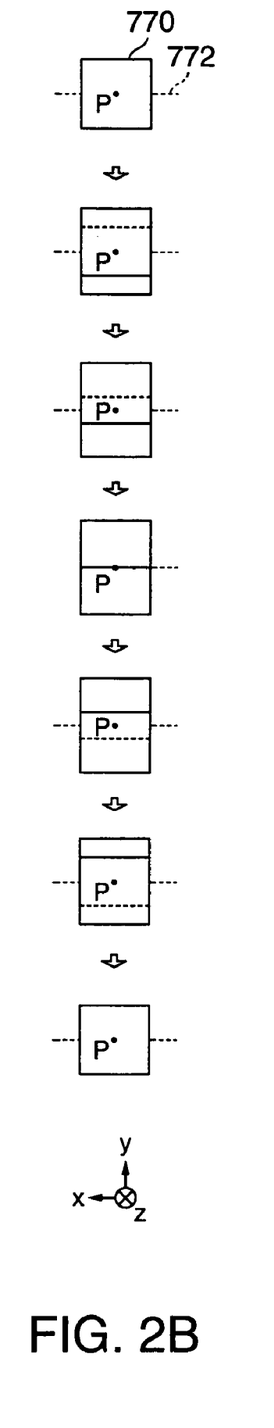
Figure 2C:
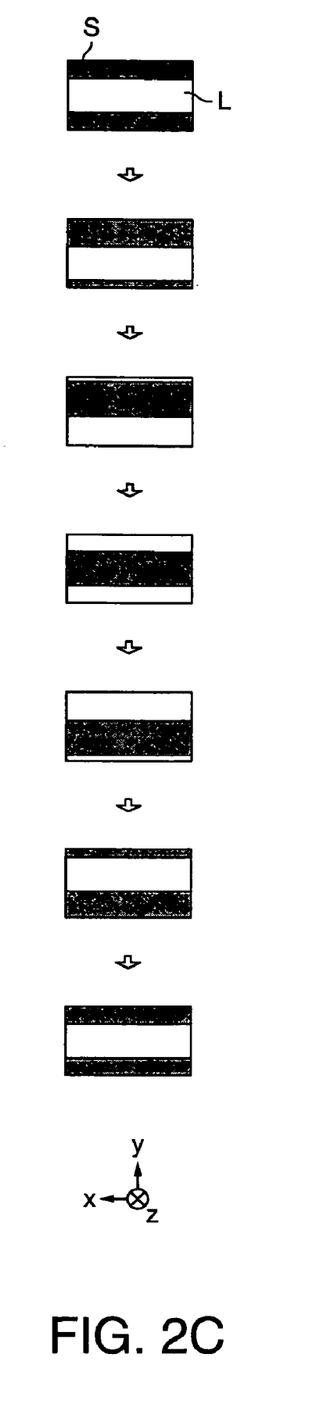

FIGS. 2A to 2C are all a diagram showing the relationship between the rotation of the rotating prism 770 and the illumination state on the liquid crystal devices 400R, 400G, and 400B. More specifically, FIG. 2A is a cross-section view of the rotating prism 770, viewed along a rotation axis 772. FIG. 2B is a view of the rotating prism 770, viewed along the illumination optical axis 100ax. FIG. 2C is a diagram showing the illumination state of the luminous fluxes on the image formation regions S of the liquid crystal devices 400R, 400G, 400B.

As shown in FIGS. 2A to 2C, when the rotating prism 770 rotates, the light coming from an image P at the virtual center point of the first lens array 120 on the illumination optical axis 100ax is refracted to a predetermined degree by the light-pass surface of the rotating prism 770. In the image formation regions S of the liquid crystal devices 400R, 400G, and 400B, the region to be illuminated and the region not to be illuminated are sequentially scrolled.

As such, as to luminous fluxes each having such a cross section, i.e., compressed in the vertical direction, as to entirely illuminate the image formation region S of the liquid crystal devices 400R, 400G, and 400B in the horizontal direction along the x-axis direction, and partially illuminate the image formation region S in the vertical direction along the y-axis direction, the projector 1000 of the first embodiment enables to scan such luminous fluxes on the image formation region S along the y-axis direction in synchronization with the frame rate of the liquid crystal devices 400R, 400G, and 400B. This allows alternate scrolling in the image formation regions S of the liquid crystal devices 400R, 400G, and 400B between a region to be illuminated and a region not to be illuminated so that the persistence of vision is corrected, favorably leading to high-quality smooth moving image display.

3. Light Shielding Member

As shown in FIGS. 1A and 1B, the light shielding member 700 is disposed between the illumination device 100 and the color-separation and light-guiding system 200 to be substantially optically conjugate with the first small lenses 122 and the liquid crystal devices 400R, 400G, and 400B for adjusting the cross section shape of the luminous fluxes. As shown in FIG. 1D, the light shielding member 700 is provided with an aperture 702, and a stray light elimination member 704. The aperture 702 has a plane shape of a rectangular shape of "vertical dimension along y-axis direction:lateral dimension along the x-axis direction=1:4". The stray light elimination member 704 reflects a reflection light coming from the light incident surface of the rotating prism 770 in a direction different from the rotating prism 770. As shown in FIG. 1D, the stray light elimination member 704 is provided on both side portions in the y-axis direction facing the aperture 702 of the light shielding member 700, and is a triangular prism that reflects the reflection light coming from the light incident surface of the rotating prism 770 substantially along the y-axis direction.

Figure 3A:
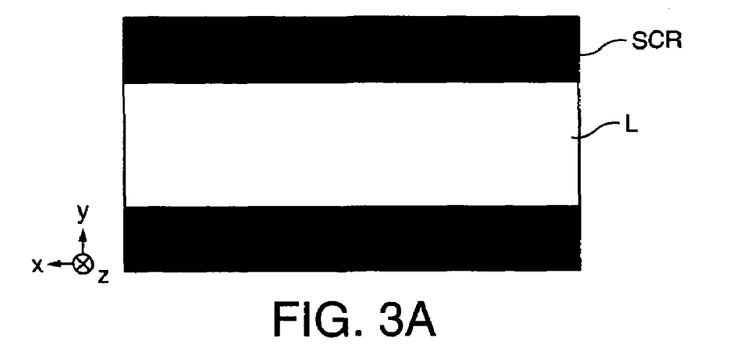
FIGS. 3A and 3B are both a diagram showing the illumination state at a specific moment on a screen SCR.
Figure 3B:
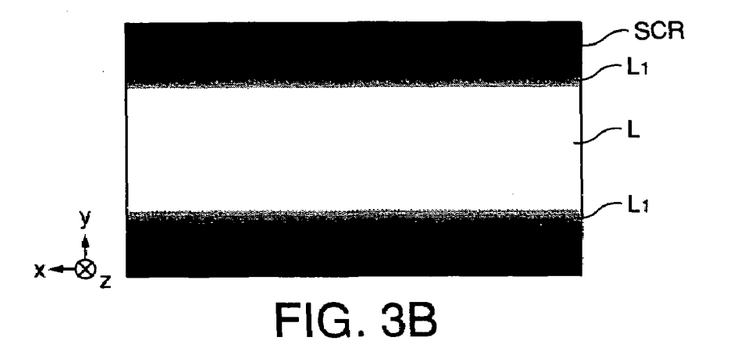

FIGS. 3A and 3B are both a diagram showing the illumination state at a specific moment on the screen SCR. Specifically, FIG. 3A is a diagram showing the virtual illumination state on the assumption that no reflection light $L_1$ comes from the light incident surface of the rotating prism 770, and FIG. 3B is a diagram showing the illumination state in a projector 1000a of a comparison example in which the reflection light $L_1$ comes from the light incident surface of the rotating prism 770.

Figure 4:
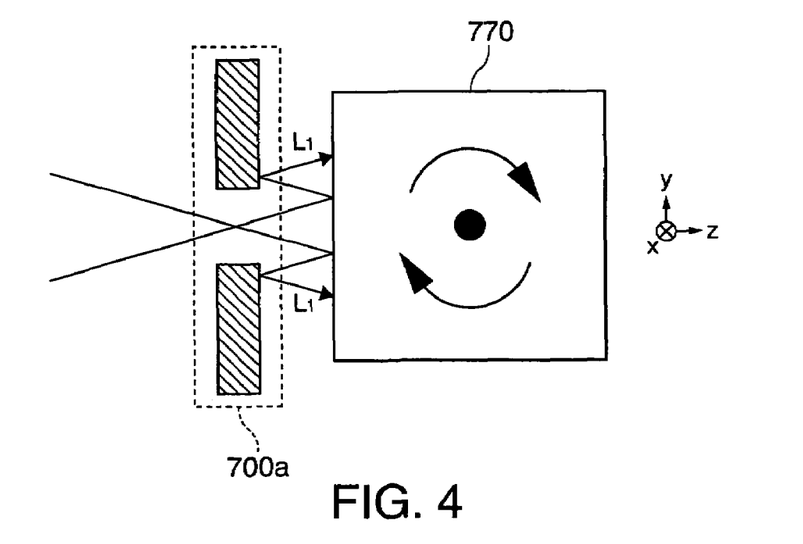
FIG. 4 is a diagram showing, in a projector 1000a of a comparison example, a reflection light $L_1$ coming from the light incident surface of the rotating prism 770 entering into the rotating prism 770 after being reflected by a light shielding member 700*a*.

FIG. 4 is a diagram showing, in the projector 1000a of the comparison example, the reflection light $L_1$ coming from the light incident surface of the rotating prism 770 entering into the rotating prism 770 after being reflected by a light shielding member 700a.

Figure 5A:
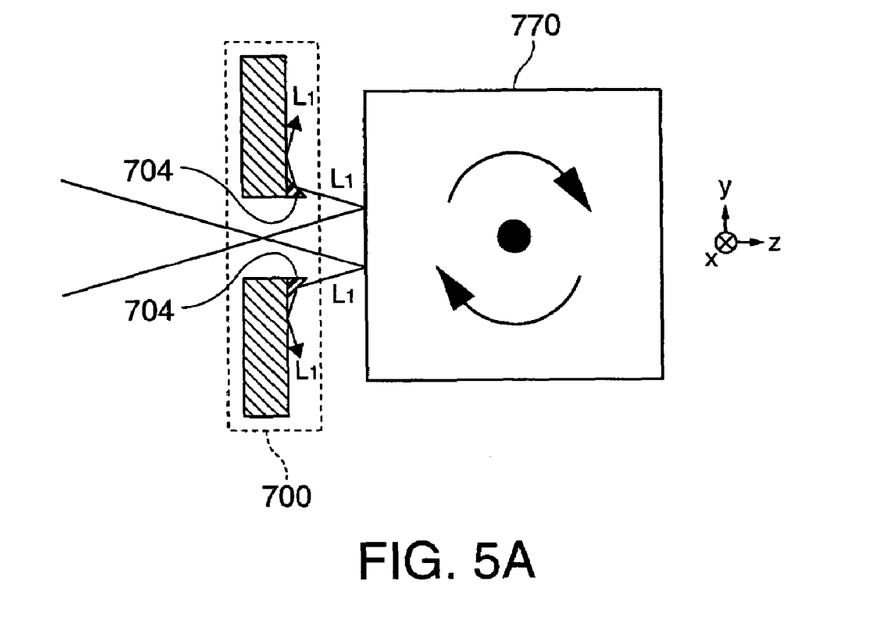
FIGS. 5A and 5B are both a diagram for illustrating the effects of the projector 1000 of the first embodiment.
Figure 5B:
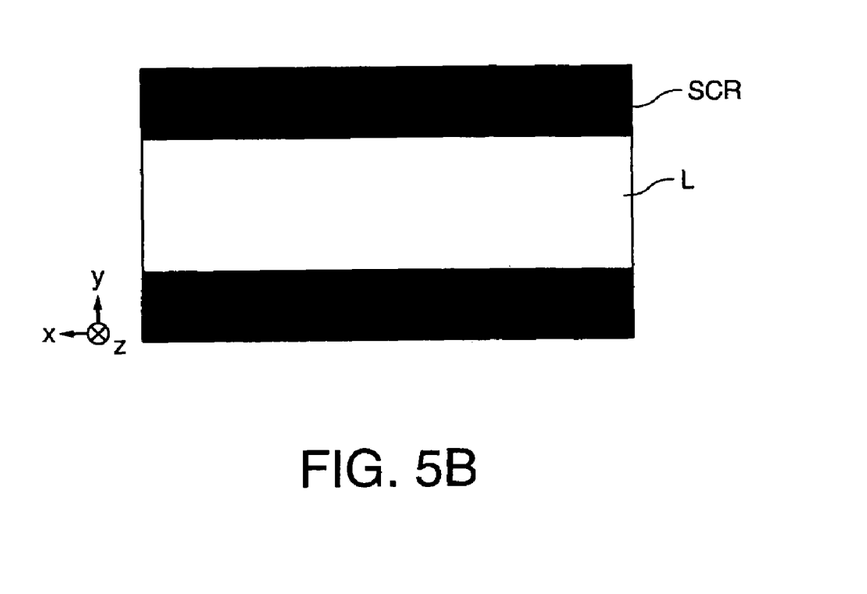

FIGS. 5A and 5B are both a diagram for illustrating the effects of the projector 1000 of the first embodiment. Specifically, FIG. 5A is a diagram showing the state in the projector 1000 of the first embodiment, in which the reflection light $L_1$ coming from the light incident surface of the rotating prism 770 is reflected by the stray light elimination member 704, and emitted to outside of the system. FIG. 5B is a diagram showing the illumination state at a specific moment on the screen SCR.

As shown in FIG. 4, the luminous fluxes coming from the light shielding member 700 are partially reflected on the light incident and light exiting surfaces of the rotating prism 770. The luminous fluxes reflected on the light incident-side surface are partially reflected again this time by the light shielding member 700a, and enter into the rotating prism 770. As a result, as shown in FIG. 3B, the both end portions of the luminous fluxes in the one direction, i.e., y-axis direction, are blurred on the image formation region S of the liquid crystal devices 400R, 400G, and 400B, and by extension, on the screen SCR. This prevents luminous flux scanning on the image formation region S along the y-axis direction, i.e., the luminous fluxes are those having such a rectangular cross section shape of "vertical dimension along y-axis direction:lateral dimension along x-axis direction=1: 4". That is, as to the y-axis direction, the luminous fluxes each having such a cross section shape as to illuminate 50 percent or more of the image formation region S are scanned on the image formation region S along the y-axis direction. This resultantly reduces the effects of high-quality smooth moving image display.

According to the projector of the first embodiment, however, as shown in FIG. 5A, the reflection light coming from the light incident surface of the rotating prism 770 is reflected toward a direction different from the rotating prism 770, i.e., toward substantially y-axis direction, thanks to the stray light elimination member 704. Accordingly, even if the light is reflected again by the light shielding member 700, the light does not enter into the rotating prism 770 any more. This accordingly prevents blurring of the luminous fluxes specifically at both end portions in the one direction, i.e., y-axis direction, on the image formation regions S of the liquid crystal devices 400R, 400G, and 400B, and allows scanning of the luminous fluxes those having such a rectangular cross section shape of "vertical dimension along y-axis direction:lateral dimension along x-axis direction=1: 4" on the image formation regions S along the y-axis direction. That is, as to the y-axis direction, the luminous fluxes each having such a cross section shape as to illuminate 50 percent of the image formation region S are scanned on the image formation region S along the y-axis direction. This favorably leads to the effects of high-quality smooth moving image display.

As such, with the light shielding member 700, the projector 1000 of the first embodiment can adjust the cross section shape of the luminous fluxes at the position substantially optically conjugate with the first small lenses 122. Such shape adjustment is made if the shape similar to the first small lenses 122 is blurred and swelled a little to derive the shape similar to the first small lenses 122, and by extension, the shape similar to the regions to be illuminated of the liquid crystal devices 400R, 400G, and 400B.

Moreover, with the stray light elimination member 704, the projector 1000 of the first embodiment can reflect the reflection light $L_1$ from the light incident surface of the rotating prism 770 in a direction different from the rotating prism 770, i.e., substantially y-axis direction. Accordingly, even if the light is reflected by the light shielding member 700, the light is not directed to the rotating prism 770 any more. As such, this successfully corrects the problem of reducing the effects of high-quality smooth moving image display due to blurring of the cross section shape of the luminous fluxes specifically at both end portions in the y-axis direction on the image formation regions S of the liquid crystal devices 400R, 400G, and 400B, and by extension, on the screen SCR.

As described in the foregoing, in the projector 1000 of the first embodiment, the stray light elimination member 704 is a triangular prism that is provided on both side portions in the y-axis direction facing the aperture 702 of the light shielding member 700, and reflects the reflection light from the light incident surface of the rotating prism 770 substantially along the y-axis direction. The stray light elimination member 704 serves to reflect the reflection light $L_1$ coming from the light incident surface of the rotating prism 770 in a direction different from the rotating prism 770.

With such a configuration, in the projector 1000 of the first embodiment, the reflection light $L_1$ coming from the light incident surface of the rotating prism 770 is reflected in the substantially y-axis direction, and thus even if the light is reflected again by the light shielding member 700, the light is not directed to the rotating prism 770 any more.

As such, the components of the projector 1000 of the first embodiment, i.e., the first lens array 120, the rotating prism 770, and the light shielding member 700 are described in detail. The projector 1000 of the first embodiment is also characterized as below.

In the projector 1000 of the first embodiment, the light source device 110 is provided with the arc tube 112, the ellipsoidal reflector 114 that reflects lights coming from the arc tube 112, and the collimating lens 118 that substantially collimates the lights reflected by the ellipsoidal reflector 114.

In the projector 1000 of the first embodiment, such a configuration can implement the light source device compact in size compared with a light source device using a paraboloidal reflector.

In the projector of the first embodiment, the arc tube 112 is provided with the n auxiliary mirror 116 that reflects, toward the arc tube 112, lights emitted from the arc tube 112 toward the side of the region to be illuminated.

With such a configuration of the projector 1000 of the first embodiment, the lights directed from the arc tube 112 toward the side of the region to be illuminated are reflected toward the arc tube 112, thereby eliminating the need for size adjustment of the ellipsoidal reflector 114 to cover the side end portions of the region to be illuminated of the arc tube 112. This favorably reduces the size of the ellipsoidal reflector 114, favorably leading to the small-sized projector. This means possible further size reduction of the first and second lens arrays 120 and 130, the polarization conversion element 140, the superimposing lens 150, the color separation system 200, and others. With this being the case, the projector 1000 can be reduced in size to a further degree.

The projector 1000 of the first embodiment is configured to include the three liquid crystal devices of 400R, 400G, and 400B all serving as an electro-optic modulator. These liquid crystal devices 400R, 400G, and 400B each modulate, in accordance with image information, their corresponding color lights as a result of color separation in the color-separation and light-guiding system 200. Also provided in the projector 1000 are the color-separation and light-guiding system 200, and the cross dichroic prism 500. The color-separation and light-guiding system 200 is provided between the rotating prism 770 and the liquid crystal devices 400R, 400G, and 400B, and separates a luminous flux coming from the rotating prism 770 into three color lights for guiding those to the liquid crystal devices 400R, 400G, and 400B. The cross dichroic prism 500 combines the resulting color lights modulated by the liquid crystal devices 400R, 400G, and 400B.

As such, the projector 1000 of the first embodiment can derive, while achieving high-quality smooth moving image display, an excellent-quality full-color projector of 3-LCD projection without causing considerable reduction of the light use efficiency.

The projector 1000 of the first embodiment is further provided with the polarization conversion element 140. When the luminous fluxes coming from the light source device 110 are not aligned in polarizing direction, the polarization conversion element 140 serves to align the luminous fluxes to be linear of a type.

The polarization conversion element 140 is provided with a polarization separation layer, a reflective layer, and a retardation film. More specifically, the polarization separation layer passes as it is a polarization component, i.e., one of linear polarization components, in the luminous fluxes coming from the light source device 110, and reflects the other linear polarization component in the direction vertical to the illumination optical axis 100ax. The reflective layer reflects the other linear polarization component reflected by the polarization separation layer in the direction parallel to the illumination optical axis 100ax. The retardation film performs polarization conversion based on, for alignment, either the linear polarization component having been passed through the polarization separation layer or the other linear polarization component reflected by the reflective layer.

As such, with the polarization conversion element 140, the luminous fluxes coming from the light source device 110 can be converted into the linear polarizing light of a type having a polarization axis. Accordingly, as with the projector 1000 of the first embodiment using an electro-optic modulator utilizing the linear polarizing light of a type, e.g., liquid crystal device, the luminous fluxes coming from the light source device 110 can be used effectively.

The projector 1000 of the first embodiment is formed with a reflection reduction layer on the light-pass surface of the rotating prism 770. This increases the light transmittance of the rotating prism 770 so that the reduction of the light use efficiency can be minimized, the stray light level can be reduced, and the contrast is improved.

Second Embodiment

Figure 6:
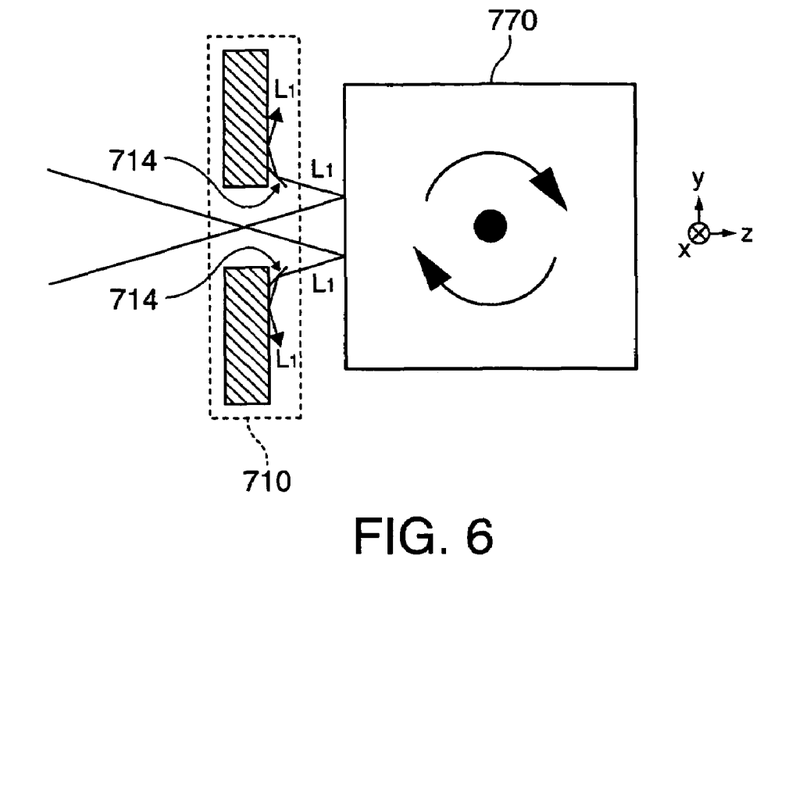
FIG. 6 is a diagram showing, in a projector 1002 of a second embodiment, the reflection light $L_1$ coming from the light incident surface of the rotating prism 770 being emitted outside of the system.

FIG. 6 is a diagram showing, in a projector 1002 of a second embodiment, the reflection light $L_1$ coming from the light incident surface of the rotating prism 770 being emitted outside of the system.

The projector 1002 (not shown) of the second embodiment has the configuration basically similar to that of the projector 1000 of the first embodiment. As shown in FIG. 6, compared with the projector 1000 of the first embodiment, the stray light elimination member is different in configuration.

That is, the projector 1002 of the second embodiment includes a stray light elimination member 714 that is configured by a reflection mirror provided on both side portions in the y-axis direction facing an aperture of the light shielding member 710, and reflects the reflection light from the light incident surface of the rotating prism 770 substantially along the y-axis direction.

As such, in the projector 1002 of the second embodiment, the stray light elimination member is different in configuration compared with that in the projector 1000 of the first embodiment. However, the projector 1002 is provided with the light shielding member 710 including the stray light elimination member 714. Accordingly, similar to the case with the projector 1000 of the first embodiment, the reflection light $L_1$ coming from the light incident surface of the rotating prism 770 is reflected toward the direction different from the rotating prism 770. Therefore, even if the light is reflected by the light shielding member 710 again, the light is not directed into the rotating prism 770. Such a configuration accordingly corrects the problem of reducing the effects of high-quality smooth moving image display due to the blurring of the cross section shape of the luminous fluxes specifically at both ends in the one direction, i.e., y-axis direction, on the image formation regions of the liquid crystal devices 400R, 400G, and 400B (not shown), and by extension, on the screen SCR (not shown).

Note here that the projector 1002 of the second embodiment is similar in configuration to the projector 1000 of the first configuration in other respects so that the projector 1002 shows the similar effects as the projector 1000.

Third Embodiment

Figure 7:
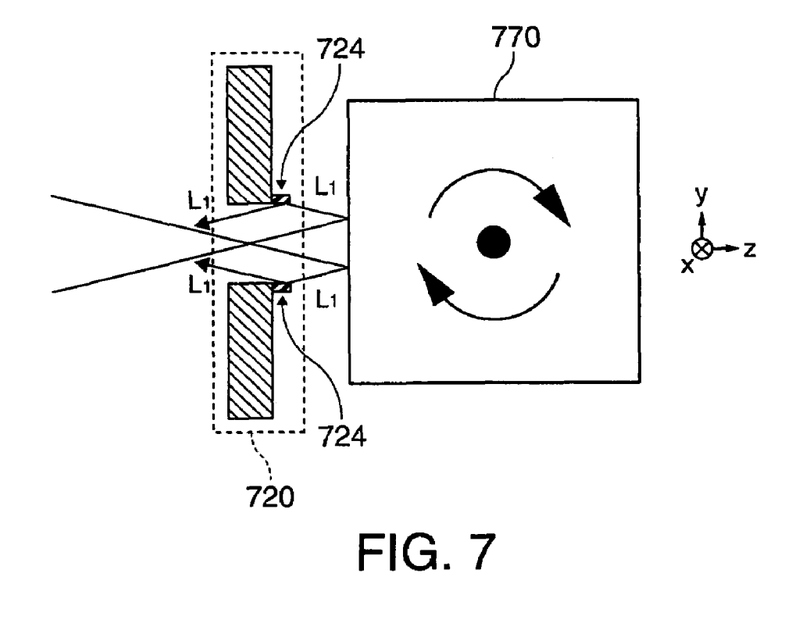
FIG. 7 is a diagram showing, in a projector 1004 of a third embodiment, the reflection light $L_1$ coming from the light incident surface of the rotating prism 770 being emitted outside of the system.

FIG. 7 is a diagram showing, in a projector 1004 of a third embodiment, the reflection light $L_1$ coming from the light incident surface of the rotating prism 770 being emitted outside of the system.

The projector 1004 (not shown) of the third embodiment has the configuration basically similar to that of the projector 1000 of the first embodiment. As shown in FIG. 7, compared with the projector 1000 of the first embodiment, the stray light elimination member is different in configuration.

That is, the projector 1004 of the third embodiment includes a stray light elimination member 724 that is configured by a reflection mirror provided on both side portions in the y-axis direction facing an aperture of a light shielding member 720, and reflects the reflection light from the light incident surface of the rotating prism 770 toward the side of the illumination device 100 (not shown).

As such, in the projector 1004 of the third embodiment, the stray light elimination member is different in configuration compared with that in the projector 1000 of the first embodiment. However, the projector 1004 is provided with the light shielding member 720 including the stray light elimination member 724. Accordingly, similar to the case with the projector 1000 of the first embodiment, the reflection light $L_1$ coming from the light incident surface of the rotating prism 770 is reflected toward the direction different from the rotating prism 770. Therefore, even if the light is reflected again by the light shielding member 720, the light is not directed into the rotating prism 770 any more. Such a configuration accordingly corrects the problem of reducing the effects of high-quality smooth moving image display due to the blurring of the cross section shape of the luminous fluxes specifically at both end portions in the one direction, i.e., the y-axis direction, on the image formation regions of the liquid crystal devices 400R, 400G, and 400B (not shown), and by extension, on the screen SCR (not shown).

Note here that the projector 1004 of the third embodiment is similar in configuration to the projector 1000 of the first configuration in other respects so that the projector 1004 shows the similar effects as the projector 1000.

Fourth Embodiment

Figure 8A:
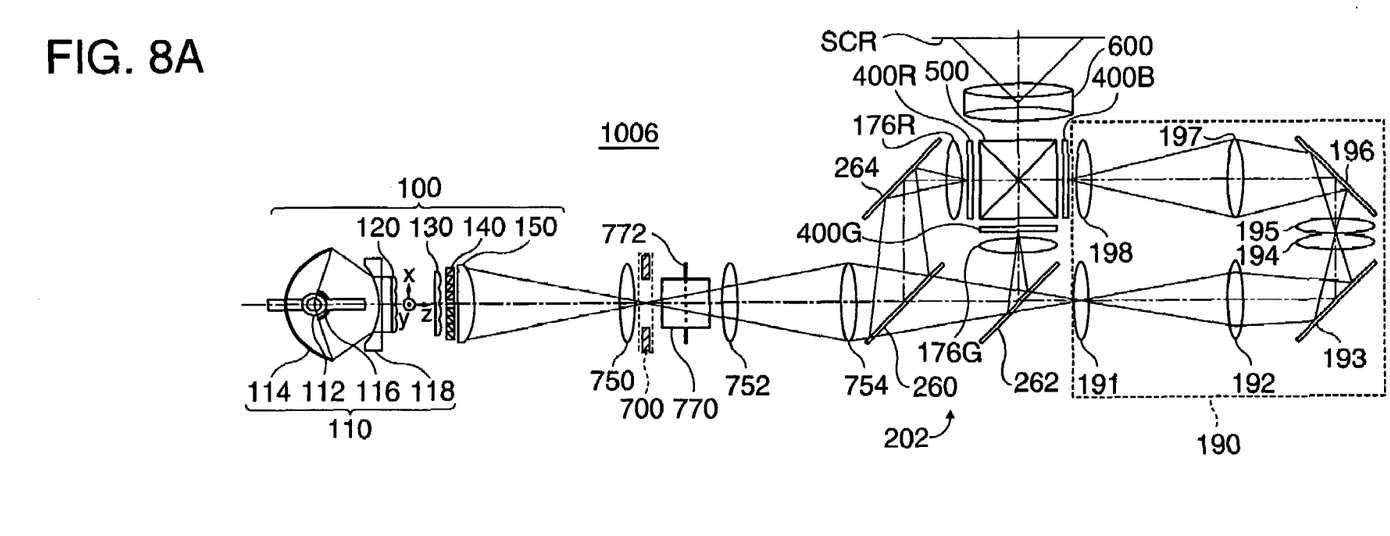
FIGS. 8A and 8B are both a diagram showing a system of a projector 1006 of a fourth embodiment.
Figure 8B:
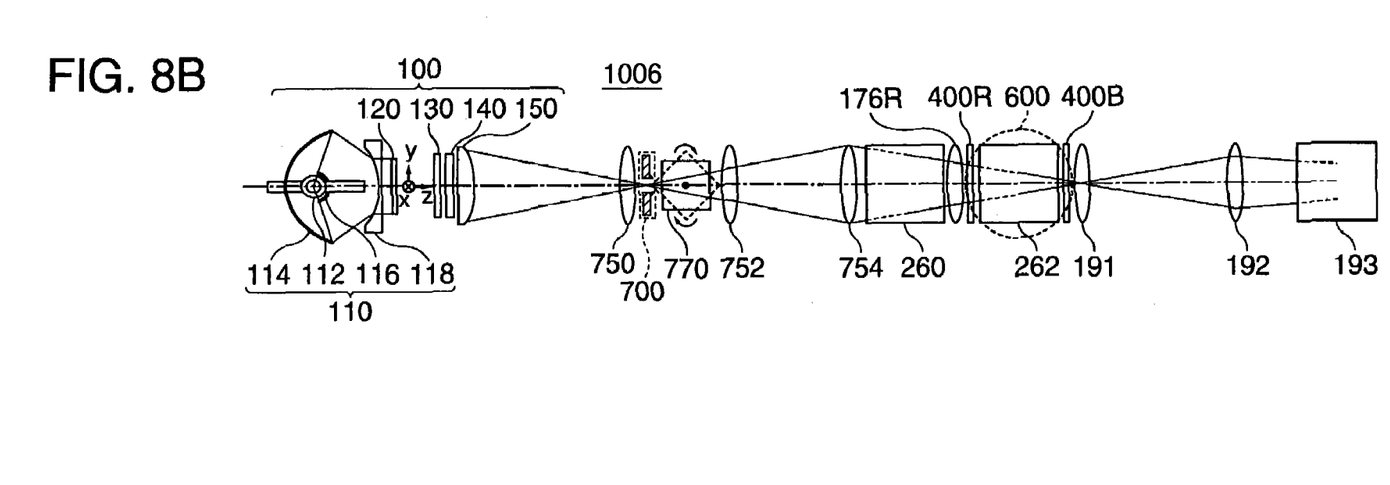

FIGS. 8A and 8B are both a diagram showing a system of a projector 1006 of a fourth embodiment. Specifically, FIG. 8A is a diagram showing the system of the projector 1006 viewed from above, and FIG. 8B is a diagram showing the system of the projector 1006 viewed from the side.

The projector 1006 of the fourth embodiment has the configuration basically similar to that of the projector 1000 of the first embodiment. As shown in FIG. 8A, compared with the projector 1000 of the first embodiment, the color-separation and light-guiding system is different in configuration.

That is, the projector 1006 of the fourth embodiment uses a double relay optical system 190 as an alternative to the color-separation and light-guiding system 200 to perfectly align the scrolling direction of the regions to be illuminated and the regions not to be illuminated on the liquid crystal devices 400R, 400G, and 400B.

As shown in FIG. 8A, the color-separation and light-guiding system 202 is provided with dichroic mirrors 260 and 262, a reflection mirror 264, and the double relay optical system 190. The double relay optical system 190 includes relay lenses 191, 192, 194, 195, and 197, reflection mirrors 193 and 196, and a field lens 198. A relay lens 754 is disposed before the color-separation and light-guiding system 202 along the optical path.

As to the light coming from the rotating prism 770, the dichroic mirror 260 reflects the red light component, and passes through the green and blue light components. The red light component reflected by the dichroic mirror 260 is reflected again this time by the reflection mirror 264, and reaches the liquid crystal device 400R that is specifically for the red light after passing through a field lens 176R.

As to the green and blue light components passed through the dichroic mirror 260, the green light component reaches the liquid crystal device 400G that is specifically for the green light after being reflected by the dichroic mirror 262, and passing through a field lens 176G. On the other hand, the blue light component passed through the dichroic mirror 260 passes through the dichroic mirror 262 and then the double relay optical system 190 before reaching the liquid crystal device 400B that is specifically for the blue light. Note here that the field lenses 176R, 176G, and 198 are provided, respectively, before the liquid crystal displays 400R, 400G, and 400B along the optical path of each lights, for converting the partial luminous fluxes emitted from the second lens array 130 into luminous fluxes substantially collimate with the main beams of light.

The reason for providing the double relay optical system 190 for the optical path of the blue light is not to reduce the light use efficiency often resulting from light scattering or others due to the longer optical path for the blue light compared with that for other color lights. Another reason therefore is to perfectly align the scrolling direction of the regions to be illuminated and the regions not to be illuminated on the liquid crystal devices 400R, 400G, and 400B. Note here that, in the projector 1006 of the fourth embodiment, the double relay optical system 190 is provided specifically to the optical path of the blue light. This is surely not restrictive, and such a double relay optical system may be provided to the optical path of the red light or any other color lights.

As such, in the projector 1006 of the fourth embodiment, the color-separation and light-guiding system is different in configuration compared with that in the projector 1000 of the first embodiment. However, the projector 1006 is provided with the light shielding member 700 including the aperture 702 and the stray light elimination member 704 similarly to those in the projector 1000 of the first embodiment. Accordingly, similarly to the case with the projector 1000 of the first embodiment, the reflection light coming from the light incident surface of the rotating prism 770 is reflected toward the direction different from the rotating prism 770. Therefore, even if the light is reflected again by the light shielding member 700, the light is not directed into the rotating prism 770 any more. Such a configuration accordingly corrects the problem of reducing the effects of high-quality smooth moving image display due to the blurring of the cross section shape of the luminous fluxes specifically at both end portions in the one direction, i.e., the y-axis direction, on the image formation regions of the liquid crystal devices 400R, 400G, and 400B, and by extension, on the screen SCR.

Note here that the projector 1006 of the fourth embodiment is similar in configuration to the projector 1000 of the first configuration in other respects so that the projector 1006 shows the similar effects as the projector 1000.

While the preferred embodiments of the invention have been described above in detail, the foregoing description is not restrictive. It is understood that numerous other modifications and variations can be devised for those embodiments without departing from the scope of the invention. For example, the following modifications and variations are possible.

1. In the projectors 1000 to 1006 of the above-described embodiments, the first small lenses 122 of the first lens array 120 have the plane shape of the rectangular shape of "vertical dimension:lateral dimension=1:4". This is surely not restrictive, and the lens with "vertical dimension:lateral dimension=9:32 in the shape of rectangular", or with "vertical dimension:lateral dimension=3:8 in the shape of rectangular" will be preferably applicable.

2. In the projectors 1000 to 1006 of the above-described embodiments, the light shielding members 700, 710, and 720 are each provided with an aperture that has the plane shape of the rectangular shape of "vertical dimension along y-axis direction:lateral dimension along x-axis direction=1:4". This is surely not restrictive, and a light shielding member including an aperture that has the plane shape of the rectangular shape of "vertical dimension along y-axis direction:lateral dimension along x-axis direction=9:32" is applicable. In a case where the first small lenses of the first lens array have the plane shape of the rectangular shape of other than "vertical dimension along y-axis direction:lateral dimension along x-axis direction=1:4", the light shielding member including an aperture whose plane shape is similar to the small lenses can be used.

3. In the projectors 1000 to 1006 of the above-described embodiments, the light source device 110 is provided with the ellipsoidal reflector 114, the arc tube 112 having a light-emitting center in the vicinity of the first focus of the ellipsoidal reflector 114, and the collimating lens 118. This is surely not restrictive, and a preferable option is a light source device that includes a paraboloidal reflector, and an arc tube having a light-emitting center in the vicinity of a focus of the paraboloidal reflector.

4. Exemplified in the above-described embodiments is a projector including the three liquid crystal devices 400R, 400G, and 400B. This is surely not restrictive, and the invention is applicable to a projector including one, two, or four or more of a liquid crystal device.

5. The invention is applicable both to a front-projection-type projector that projects images onto a screen from the front side to make the images viewable for users on the front side, and a rear-projection-type projector that projects images onto a screen from the rear side to make the images viewable for users on the front side.

The entire disclosure of Japanese Patent Application No. 2005-019258, filed Jan. 27, 2005 is expressly incorporated by reference herein.

What is claimed is:

1. A projector, comprising:
an illumination device provided with:
a light source device that emits a substantially parallel luminous flux to a side of a region to be illuminated;
a first lens array including a plurality of first small lenses that divide the luminous flux coming from the light source device into a plurality of partial luminous fluxes;
a second lens array including a plurality of second small lenses corresponding to the plurality of first small lenses of the first lens array; and
a superimposing lens that superimposes, in the region to be illuminated, the partial luminous fluxes coming from the plurality of second small lenses of the second lens array,
an electro-optic modulator that modulates the luminous flux coming from the illumination device in accordance with image information, each first small lens in the first lens array has a plane shape compressed in a direction which is either vertical or horizontal direction of the image formation region of the electro-optic modulator to make the luminous flux coming from the illumination device entirely illuminate an image formation region of the electro-optic modulator in the other direction thereof, and partially illuminate the image formation region in the one direction;
a light shielding member that is disposed between the illumination device and the electro-optic modulator to be substantially optically conjugate with the plurality of first small lenses and the electro-optic modulator for adjusting the cross section shape of the luminous flux; and
a rotating prism that is disposed on a side of the electro-optic modulator of the light shielding member for scanning, on the image formation region of the electro-optic modulator, the luminous flux coming from the light shielding member along the one direction in synchronization with a frame rate of the electro-optic modulator,
a stray light elimination member provided with the light shielding member that reflects a reflection light from a light incident surface of the rotating prism in a direction different from the rotating prism; and
a projection optical system that projects a light modulated by the electro-optic modulator.

2. The projector according to claim 1, wherein

An aperture is provided on the light shielding member;

the stray light elimination member is a triangular prism that is provided on both side portions of the aperture in the one direction, and reflects the reflection light from the light incident surface of the rotating prism substantially along the one direction.

3. The projector according to claim 1, wherein

An aperture is provided on the light shielding member;

the stray light elimination member is a reflection mirror that is provided on both side portions of the aperture in the one direction, and reflects the reflection light from the light incident surface of the rotating prism substantially along the one direction.

4. The projector according to claim 1, wherein

An aperture is provided on the light shielding member;

the stray light elimination member is a reflection mirror that is provided on both side portions of the aperture in the one direction, and reflects the reflection light from the light incident surface of the rotating prism toward a side of the illumination device.

5. The projector according to claim 1, wherein the light source device is provided with an arc tube, an ellipsoidal reflector that reflects a light from the arc tube, and a collimating lens that collimates a light reflected by the ellipsoidal reflector, or provided with the arc tube, and a paraboloidal reflector that reflects the light from the arc tube as a substantially collimated light.

6. The projector according to claim 5, wherein the arc tube is provided with an auxiliary mirror that reflects, toward the arc tube, the light emitted from the arc tube toward the side of the region to be illuminated.

7. The projector according to claim 1, comprising:

a color-separation and light-guiding system that is disposed between the rotating prism and the electro-optic modulator, and separates the luminous flux coming from the rotating prism into a plurality of color lights;

two or more of the electro-optic modulator that modulate the color lights coming from the color-separation and light-guiding system in accordance with image information corresponding to each of the color lights; and a cross dichroic prism that combines the color lights modulated in the electro-optic modulators.

* * * * *